April 15, 1958  S. D. POLSEN ET AL  2,830,744
DISPENSING APPARATUS
Filed April 15, 1955  2 Sheets-Sheet 1
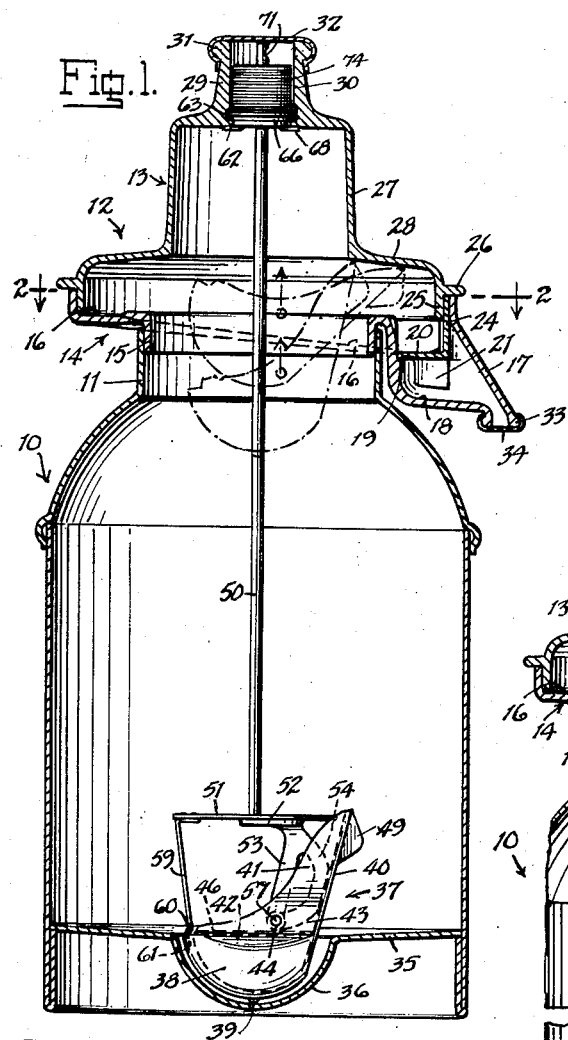
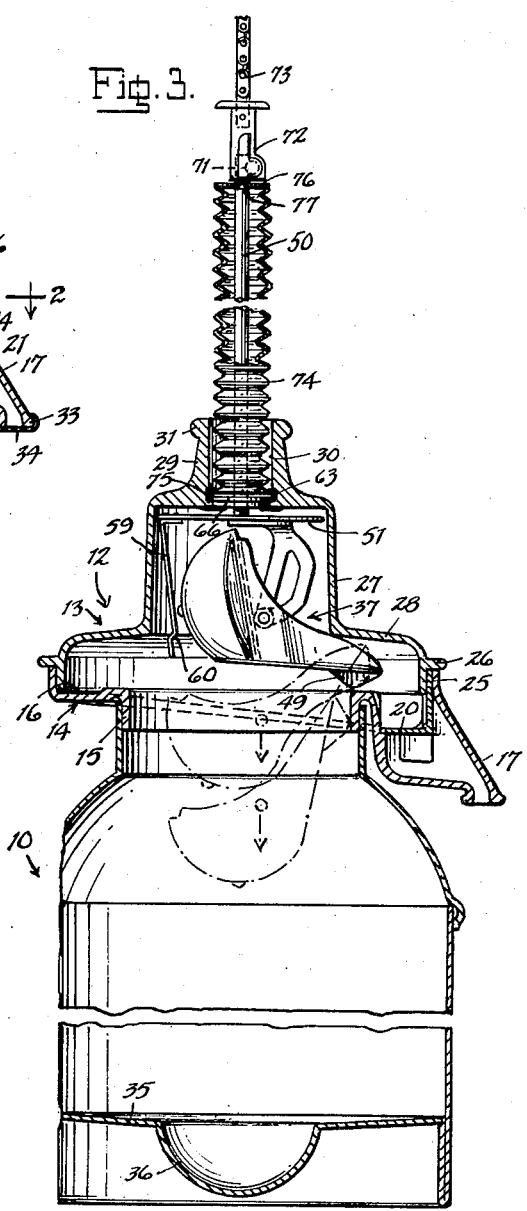
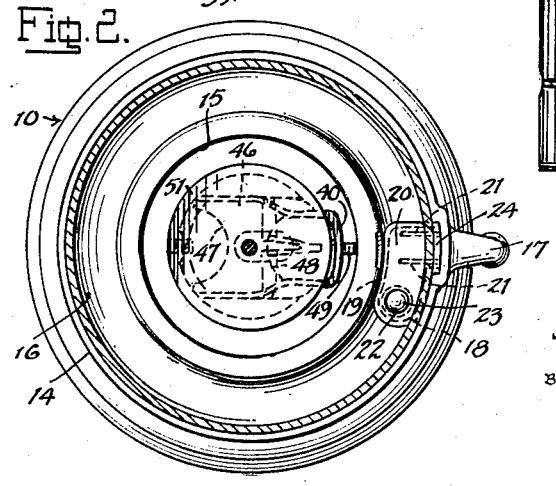
Inventors
SVEN HERBERT NELSON
AND SAMUEL D. POLSEN
By
Attorney April 15, 1958 S. D. POLSEN ET AL 2,830,744
DISPENSING APPARATUS
Filed April 15, 1955 2 Sheets-Sheet 2
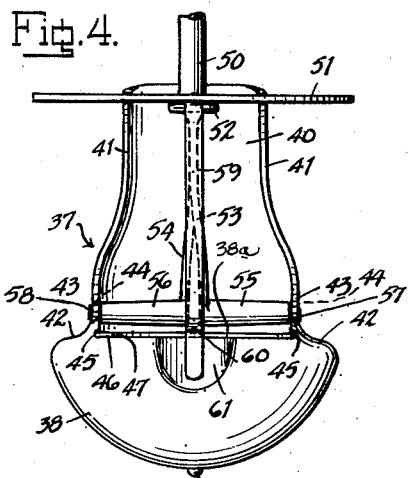
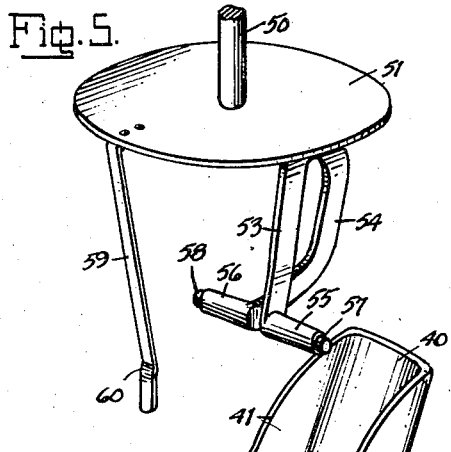
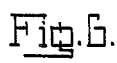
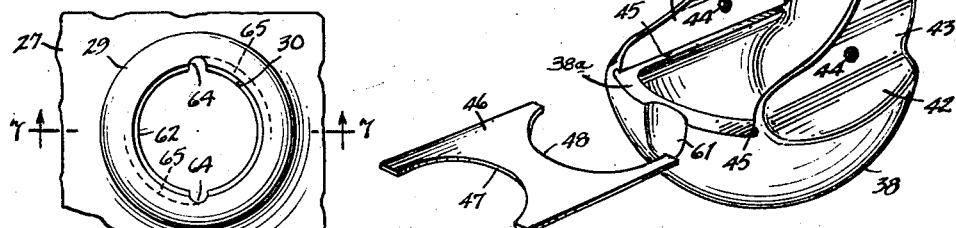
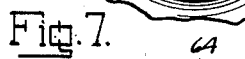
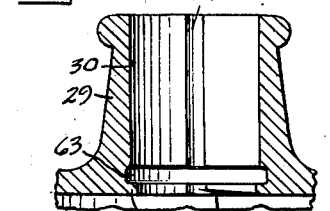
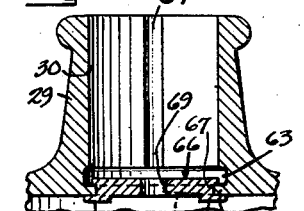
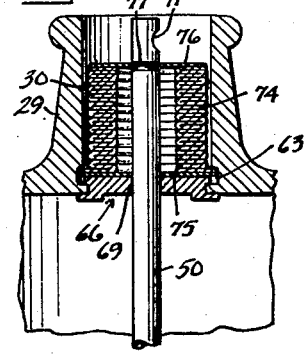
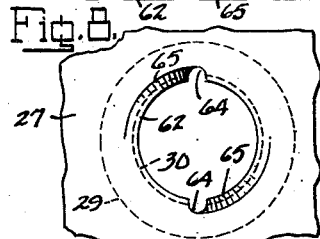
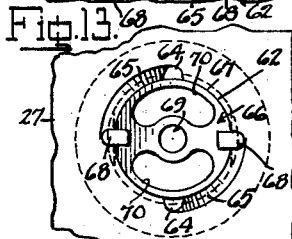
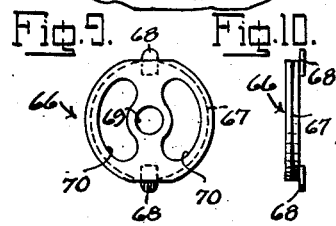
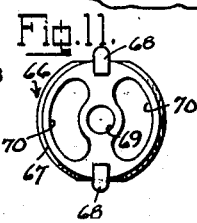
Inventors
SVEN HERBERT NELSON
AND SAMUEL D. POLSEN
By
Attorney

United States Patent Office 2,830,744
Patented Apr. 15, 1958

2,830,744

DISPENSING APPARATUS

Samuel D. Polsen and Sven Herbert Nelson, Fairfield, Conn.

Application April 15, 1955, Serial No. 501,559

7 Claims. (Cl. 222—357)

The present invention relates to an improved dispensing apparatus, particularly a container for milk or other liquids, having a dipper suspended therein and adapted to be reciprocated upwardly and downwardly through the liquid in the container to mix it, and further adapted, in an elevated position within the container, to be tilted to pour the contents of the dipper into a dispensing means including a spout through which the liquid flows into a suitable cup or other receptacle.

The invention is for use in an automatic dispensing apparatus of the coin slot type which is adapted, through a cycle of operation initiated through the insertion of a coin, to operate the dipper within the container to dispense a measured quantity of liquid, and constitutes an improvement over the dispensing apparatus disclosed in our prior Patents No. 2,354,348 of July 25, 1944, for Dispensing Apparatus; No. 2,378,430 of June 19, 1945, for Dispensing Apparatus; and No. 2,556,739 of June 12, 1951, for Milk Agitating and Dipping Device.

An object of the invention is to provide means whereby a more positive actuation of the dipper is brought about through its raising and lowering movements, and particularly whereby the dipper is maintained against unintentional tilting during such movements, to the end that a better agitation of the liquid takes place and the likelihood of spilling the measured quantity of liquid in the dipper is prevented.

A further object is to provide means whereby the measured quantity of liquid is more accurately maintained than has heretofore been possible, and to this end it is proposed to provide means whereby the capillary or surface tension action of the liquid which, when unrestrained, enables it to bulge over the upper edge of the dipper, is counteracted whereby the measured quantities of liquid are accurately maintained.

Another object is to provide improved means for permitting the easy disassembly of the dipper and its supporting means for effective cleaning.

Another object is to provide an improved cup having means which, in the case of liquids, such as soups or the like having garnish or other solid particles therein, prevents crushing of such particles between the cup and the bottom of the container.

A still further object is to provide an improved bearing means within the mouth opening in the head of the container for the dipper actuating reciprocating rod which may be readily removed through the upper end of the mouth opening, and is prevented from moving downwardly through the lower end of the mouth opening, to the end that the mouth opening may be completely cleared of obstructing parts for the purpose of thoroughly cleaning it by inserting a cleaning brush or the like therein.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a vertical central sectional view of the container of the invention, the dipper being shown in its lower position in the container, the dot-and-dash lines showing elevated positions of the dipper as it is tilted through upward movement;

Fig. 2 is a horizontal sectional view taken along the line 2—2 of Fig. 1;

Fig. 3 is a vertical sectional view, similar to Fig. 1, with parts broken away, and showing the dipper in its elevated dispensing position to which it is raised by the mechanism of the machine, the dot-and-dash lines indicating two positions of the dipper as it starts its downward movement from its tilted position to its normal position;

Fig. 4 is a front elevation, on an enlarged scale, of the dipper and the lower end of the supporting rod;

Fig. 5 is a perspective view showing the parts illustrated in Fig. 4 in separated relation;

Fig. 6 is a top plan view of the upper mouth end of the head of the container with the rod and other parts removed;

Fig. 7 is a vertical sectional view taken along the line 7—7 of Fig. 6;

Fig. 8 is a bottom plan view of the mouth end of the container head;

Fig. 9 is a top plan view of the spider bearing member;

Fig. 10 is an edge view thereof;

Fig. 11 is a bottom plan view;

Fig. 12 is a vertical sectional view, like Fig. 7, and showing the spider bearing member locked in place therein;

Fig. 13 is a bottom plan view of the parts as shown in Fig. 12; and

Fig. 14 is a vertical sectional view, similar to Fig. 12, and showing the rod and sealing unit in place.

Referring to the drawings, the container, generally indicated as 10, has an open upper end surrounded by a neck portion 11. On its upper end there is removably mounted a head assembly, generally indicated as 12, including upper and lower separable parts 13 and 14, the lower head part comprising an annular depending flange 15 frictionally fitting within the neck portion 11, and an annular trough 16 which inclines from one side of the part 14 to a discharge spout 17 at the diametrically opposite side.

The spout includes a well portion 18 having a ledge 19 on which there is seated a horizontal guard member 20 having baffle fins 21—21 depending from its under side and disposed at each side of the entrance to the spout, and having an offset hole 22 through which liquid flows into the well and then around the baffle fins to the spout. Within the well there is provided a floatable ball valve 23 which normally rests upon the bottom of the well, but which is adapted to close the hole 22 in the case of inverting the container to attempt to pour liquid therein through the spout, or to force liquid upwardly through the container in an attempt to fill it through the spout. The guard member is normally held in place by a vertical finger 24 extending upwardly from its forward edge and engaged at its upper edge by the upper head part 13 to retain the guard in place. Upon separation of the upper part, the guard is free to be lifted out for cleaning purposes. The baffle fins prevent the insertion of any instrument through the spout into engagement with the ball valve should any attempt be made to hold it off its seat to permit of the passing of liquid into the container through the spout.

The upper head part 13 functions as a cover for the open upper end of the container, as well as for the trough 16, and includes a downwardly extending annular flange 25 entering the open upper end of the lower head part 14 with a frictional fit and a radially extending annular flange 26 limiting movement of the flange 25 into the part 14. The upper head part is of generally bell-like shape and includes an upstanding dome part 27 connected to the flange 25 by an annular outwardly and downwardly inclined wall portion 28, the dome portion 27 having upon its upper end a reduced diameter neck portion 29 having a cylindrical mouth opening 30 within which is disposed the spider bearing member and sealing means, presently to be more fully described.

Following its filling at a dairy or the like, the container is adapted to be delivered to the machine in a sealed condition, and, for this purpose, the neck 29 is provided at its upper end with an annular external bead 31 with which a removable sealing cap 32 is engaged. Similarly the lower end of the spout 17 is provided with a bead 33 engaged by a similar removable sealing cap 34. The head portion 12 is preferably sealed to the can by a suitable known sealing means as, for instance, wire loops connected between the handles, usually provided at opposite sides of the container, and the radial flange 26, which may have suitable holes for receiving such wire loops, the wire loops having their ends clamped between a suitable lead seal. This is standard procedure in securing a cover in sealed relation to a can, so that a detailed illustration and further description of this feature is not deemed necessary to the present disclosure.

The bottom wall 35 of the container is provided centrally with a recess 36 of substantially semi-spherical form, the bottom wall inclining from its outer periphery inwardly toward the recess. The dipper, indicated generally as 37, comprises a bowl-like lower cup portion 38 of substantially semi-spherical form at its under side, so that it is adapted to fit within the recess in substantially concentric relation therewith, a downwardly projecting boss 39 being preferably provided centrally upon its under side in order to maintain a space between the dipper and the recess so as not to crush garnish or other solid particles contained in soups or similar liquids. In the case of milk, the boss may be dispensed with, the cup fitting snugly in the recess. In either case, the lip 38a of the cup portion is below the upper edge of the recess in the lowered position of the dipper, so that substantially the full contents of the container will be dispensed.

The dipper is provided opposite the lip of the cup portion with an upwardly and outwardly inclined spout-like pouring portion including an inclined wall 40 and side walls 41—41 which connect at their lower ends to shoulder portions 42—42 extending inwardly from each side of the cup portion 38. These side walls 41 include substantially parallel portions 43 provided with bearing holes 44 for pivotal connection of the cup with the operating rod, as will presently more fully appear, these holes being offset toward the spout portion from the vertical center line of the dipper, and the wall of the cup portion 38 being preferably thickened toward its forward end, so that when pivotally supported it tends to turn in counter-clockwise direction toward its normal non-tilted position.

The inner sides of the parallel side wall portions 43, adjacent the upper edge of the lower cup portion 38, are respectively provided with guide grooves 45—45 for slidably receiving the edges of a plate 46 having forward and rearward substantially semi-circular cutouts 47 and 48, this plate adapted to break the capillary or surface tension action of liquid in the cup portion, which when filled would otherwise bulge upwardly. This insures uniform measured cup-fulls of the liquid, so that it is possible to determine from the number of cup-fulls dispensed when the container is empty. The plate 46 is readily removable for effective cleaning of the cup. In the upper end of the outer side of the spout portion 42 there is provided a projecting cam fin 49 adapted, as will presently more fully appear, to positively guide the cup in its up and down movements through the opening in the upper end of the container defined by the flange 15 of the head assembly 12.

The operating means for raising and lowering the dipper consists of a vertical rod 50 provided at its lower end with a liquid agitating disc member 51, upon the underside of which there is secured a dipper supporting member consisting of an upper mounting portion 52 and a pair of downwardly extending arms 53 and 54, provided at their respective lower ends with outwardly extending axle portions 55 and 56 spaced apart at their inner ends and having reduced diameter bearing studs 57 and 58 upon their respective ends. The arms 53 and 54 are formed of suitable spring-like metal so that their lower ends may be compressed inwardly toward each other to thus draw the studs inwardly.

The studs normally engage the holes 44 of the dipper and by compressing the arms toward each other the studs may be readily disengaged from the holes to remove the cup for cleaning purposes. The arm 54 is rearwardly extended in arched relation to the arm 53 and serves as a stop for positioning the cup member in its normal non-tilted position through engagement with the inner surface of the inclined spout portion 40.

At the forward edge of the disc member 51 there is secured a downwardly extending leaf spring 59 provided near its lower end with a stop shoulder 60, and which is adapted to frictionally engage the forward recessed portion 61 of the cup to maintain it in its normal non-tilted position as it moves through the liquid, thus positioning the cup so that it will engage the recess 36 at the lower end of its downward movement and prevent premature tilting of the cup during its upward movement. The retaining shoulder 60 is such that substantial force upon the cup to tilt it in clockwise direction will overcome the force of the spring and thus allow the cup to tilt.

The mouth opening 30 of the neck portion 29 of the upper part 13 of the container head portion is provided at its lower end with an inwardly projecting annular ledge 62, and immediately above this ledge is provided with an annular groove 63. Vertically extending diametrically opposed slots 64—64 are provided in the wall of the opening and extend from the upper edge of the neck portion to the lower side of the ledge 62. The lower side of the ledge is provided with annular wedging portions 65—65 extending in opposite relation to each other from one side of the lower end of each of the slots 64, their inclination being substantially slight and their circumferential extent being substantially 90°.

A spider bearing member, indicated generally as 66, is of generally circular form and is of an outside diameter to be slidably engaged within the mouth opening 30. At its underside it is provided with an annular shouldered recess 67 of a diameter to seat upon the ledge 62, and at diametrically opposite points in its underside there are provided projecting lugs 68—68 which are adapted to be loosely received in the slots 64—64. A central bearing hole 69 is provided for slidably receiving the dipper rod 50, and at each side there are provided relatively large openings 70—70 which permit easy handling of the spider member, while inserting or removing it, by engaging the fingers in their openings. The spider member is engaged in the mouth opening through its upper end by engaging the lugs 68 with the slots 64 and thereupon pressing it downwardly to the point where the annular recess 67 is seated upon the ledge 62.

The lugs 68 are disposed at the underside of the ledge and by turning the spider member with the fingers engaged in the openings 70, the lugs ride into wedging engagement with the inclined surfaces 65—65, thereby firmly retaining the spider member, the connection being of the type characterized as a bayonet joint. It is apparent that when the spider member is removed, a straight clear opening is provided through the neck portion 29 so as to enable thorough cleaning of the mouth opening 30 with a brush inserted therein.

The rod 50 is slidably engaged in the bearing hole 69 and at its upper end is provided with a notch 71, by means of which it may be coupled by a coupling member 72 to a chain 73 which is connected to suitable mechanism for raising and lowering the rod and thus the dipper in the container. The length of the rod is such that in the lowered position of the dipper, as seen in Fig. 1, its upper end is slightly below the upper edge of the neck portion 29 so that it may be sealed within the container during delivery of the container. Also engaged within the mouth opening 30 and sealed during delivery is a bellows-type sealing element 74 which is provided at its lower end with a centrally apertured disc-like securing portion 75 which projects outwardly at its periphery and is adapted to be snapped into engagement with the annular groove 63 and thus secure the lower end of the sealing member. At its upper end it is provided with a centrally apertured disc member 76 which is snapped into engagement with a groove 77 adjacent the upper end of the rod 50. Thus during raising and lowering movement of the rod, the bellows member is expanded and contracted, the rod moving through the lower end 75 of the sealing member and carrying with it the upper end 76 thereof.

The diameter of the agitating disc member 51 is such that it is adapted to move into the dome portion 27 of the upper part 13 of the head portion upon elevation of the dipper by the upward movement of the rod 50, as shown in Fig. 3, and the upper end of the spout portion 42 of the dipper is normally vertically opposed to the underside of the portion 28 near its inner edge so that as the dipper is elevated from the position shown in full lines in Fig. 1 to the lower dot-and-dash line position, the edge of the spout portion engages the underside of the portion 28. Then, upon further upward movement of the rod, the dipper is caused to tilt as shown by the upper dot-and-dash line position. As soon as this occurs, the dipper is released from the retaining spring 59, and as the rod 50 reaches its upper limit, as seen in Fig. 3, the dipper is tilted to the pouring position, as seen in full lines in Fig. 3.

It is pointed out that by virtue of the inclined trough surrounding the annular flange 15 of the lower part 14, it is not necessary that the dipper always remain in a given angular position within the container, as it will function to empty into the trough in any angular position, the inclination of the trough causing the liquid to flow to the spout. The projection of the cam web 49 is such that it will slidably engage the inner wall of the flange 15 during the vertical raising and lowering movement of the dipper without any possibility of prematurely tilting the dipper, the edge of the pouring spout of the dipper being spaced from the flange 15.

As the dipper starts its downward movement from the full line position as seen in Fig. 3, the cam web 49 first engages the upper edge of the flange 15 to swing the dipper toward its normal position, and thereupon moves it into its normal position as the cam web moves downwardly in engagement with the flange 16, the upper and lower dot-and-dash line positions respectively showing the dipper in a partially tilted position and in its non-tilted normal position. In this latter position, the inner surface of the spout portion of the dipper is brought against the arm 54, and at the same time the spring 59 engages the recessed portion 61 beneath the lip of the cup portion to thus yieldably retain the dipper in its normal non-tilted position.

What is claimed is:

1. In a dispensing apparatus, a container having an open upper end, a head on said end having an annular inner wall, an annular trough in said head outwardly of said annular inner wall, a discharge opening from said trough, a centrally disposed bearing in said head, a vertically reciprocating rod movable through said bearing, and a dipper tiltably carried upon the lower end of said rod, said dipper including a cup portion having a lip and a pouring portion opposite said lip, said pouring portion adapted upon elevation of said rod to engage said head to tilt said dipper into pouring position with respect to said trough and discharge opening, and a yieldable retaining member carried by said rod engaged with said dipper to yieldably retain it in a non-tilted position.

2. In a dispensing apparatus, a container having an open upper end, a head on said end having an annular inner wall, an annular trough in said head outwardly of said annular inner wall, a discharge opening from said trough, a centrally disposed bearing in said head, a vertically reciprocating rod movable through said bearing, and a dipper tiltably carried upon the lower end of said rod, said dipper including a cup portion having a lip and a pouring portion opposite said lip, said pouring portion adapted upon elevation of said rod to engage said head to tilt said dipper into pouring position with respect to said trough and discharge opening, and a cam member projecting from said pouring portion of said dipper engageable with said inner wall of said head to retain said dipper in non-tilted position during upward movement and to move said dipper from a tilted pouring position to a non-tilted position during downward movement.

3. In a dispensing apparatus, a container having an open upper end, a head on said end having an annular inner wall, an annular trough in said head outwardly of said annular inner wall, a discharge opening from said trough, a centrally disposed bearing in said head, a vertically reciprocating rod movable through said bearing, and a dipper tiltably carried upon the lower end of said rod, said dipper including a cup portion having a lip and a pouring portion opposite said lip having spaced side walls respectively provided with axially aligned bearing means, said pouring portion adapted upon elevation of said rod to engage said head to tilt said dipper into pouring position with respect to said trough and discharge opening, means removably securing said dipper to said rod comprising a member having a pair of spring arms disposed centrally between said spaced side walls of said pouring portion and axle bearing portions respectively carried by said arms and extending in coaxial relation outwardly therefrom and pivotally engaged at their outer ends with said bearing means of said dipper to tiltably support it, said spring arms being normally spaced apart and adapted upon being pressed together to disengage said axle bearing portions from said bearing means of said dipper.

4. In a dispensing apparatus, a container having an open upper end, a head on said end having an annular inner wall, an annular trough in said head outwardly of said annular inner wall, a discharge opening from said trough, a centrally disposed bearing in said head, a vertically reciprocating rod movable through said bearing, and a dipper tiltably carried upon the lower end of said rod, said dipper including a cup portion having a lip and a pouring portion opposite said lip, said pouring portion adapted upon elevation of said rod to engage said head to tilt said dipper into pouring position with respect to said trough and discharge opening, a plate member removably engaged within said dipper at the upper side of said cup portion, said plate member having liquid receiving and pouring openings respectively adjacent the lip of said cup portion and said pouring portion.

5. In a dispensing apparatus, a container having an open upper end, a head on said end having an annular inner wall, an annular trough in said head outwardly of said annular inner wall, a discharge opening from said trough, a centrally disposed bearing in said head, a vertically reciprocating rod movable through said bearing, and a dipper tiltably carried upon the lower end of said rod, said dipper including a cup portion substantially in the shape of a half sphere having a lip and a pouring portion opposite said lip, said pouring portion adapted upon elevation of said rod to engage said head to tilt said dipper into pouring position with respect to said trough and discharge opening, a bottom wall in said container having a recess substantially in the shape of a half sphere adapted to receive said dipper in its lower position, said recess being of substantially greater radius than the radius of said cup portion and spacing means cooperating between said dipper and said recess to prevent crushing of particles of the contents of said container disposed in said recess.

6. In a dispensing apparatus, a container having an open upper end, a head on said end, a central bearing mounting carried by said head having a vertically extending cylindrical opening, an inwardly projecting annular ledge at the lower end of said cylindrical opening having upper and lower sides and defining a circular opening of less diameter than said cylindrical opening, a circular bearing member of less diameter than the diameter of said cylindrical opening engageable downwardly through the upper end of said cylindrical opening and seated upon the upper side of said ledge, said circular opening defined by said ledge being of less diameter than the diameter of said bearing member whereby the latter is incapable of passing downwardly therethrough, means engageable with the lower side of said ledge and removably securing said bearing member upon said ledge, said bearing member having a central bearing hole, a reciprocating dipper supporting rod engaged in said bearing hole of said bearing member, and a dipper carried at the lower end of said rod.

7. The invention as defined in claim 6, further characterized in that said securing means comprises cooperating lug means carried by said bearing member and wedge means upon the lower side of said ledge adapted upon rotation of said bearing member in one direction to secure it and upon rotation in the other direction to release it, said ledge means having notch means for the passage of said lug means from the upper to the lower side of said ledge.

References Cited in the file of this patent

UNITED STATES PATENTS 2,354,348     Polsen et al. _____ July 25, 1944